(12) United States Patent
Nagao

(10) Patent No.: US 7,254,284 B2
(45) Date of Patent: Aug. 7, 2007

(54) IMAGE PROCESSING APPARATUS AND IMAGE PROCESSING METHOD FOR PROCESSING DIGITIZED IMAGE DATA

(75) Inventor: Takashi Nagao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 820 days.

(21) Appl. No.: 10/384,541

(22) Filed: Mar. 11, 2003

(65) Prior Publication Data

US 2003/0179927 A1    Sep. 25, 2003

(30) Foreign Application Priority Data

Mar. 20, 2002    (JP)    ............... 2002-078250

(51) Int. Cl.
*G06K 9/36*    (2006.01)
(52) U.S. Cl. ................... 382/304; 382/307
(58) Field of Classification Search ............... 382/302, 382/303, 304, 307
See application file for complete search history.

(56) References Cited

U.S. PATENT DOCUMENTS 5,732,164 A * 3/1998 Kawaguchi et al. ........ 382/304
6,104,842 A * 8/2000 Rich ........................ 382/304
6,421,749 B1 * 7/2002 Devlin et al. ................ 710/65
2001/0021278 A1 * 9/2001 Fukuda et al. .............. 382/302

FOREIGN PATENT DOCUMENTS

| JP | 5-260373 A | 10/1993 |
| JP | 7-105020 A | 4/1995 |
| JP | 8-272981 A | 10/1996 |

* cited by examiner

*Primary Examiner*—Andrew W. Johns
(74) *Attorney, Agent, or Firm*—Oliff & Berridge, PLC

(57) ABSTRACT

In a pipeline process operation including a branching process unit 25 as one of process modules, this branching process unit 25 is provided with an input management unit 251 for managing an input condition, a branching information management unit 252 for managing information as to branching destinations, a buffer unit 253 whose upper storage limit can be designated, and a branching control unit 254 for controlling an entire branching process unit. The branching process unit 25 may execute an arbitrary number of branching process operations without having such a buffer for an entire image.

11 Claims, 10 Drawing Sheets

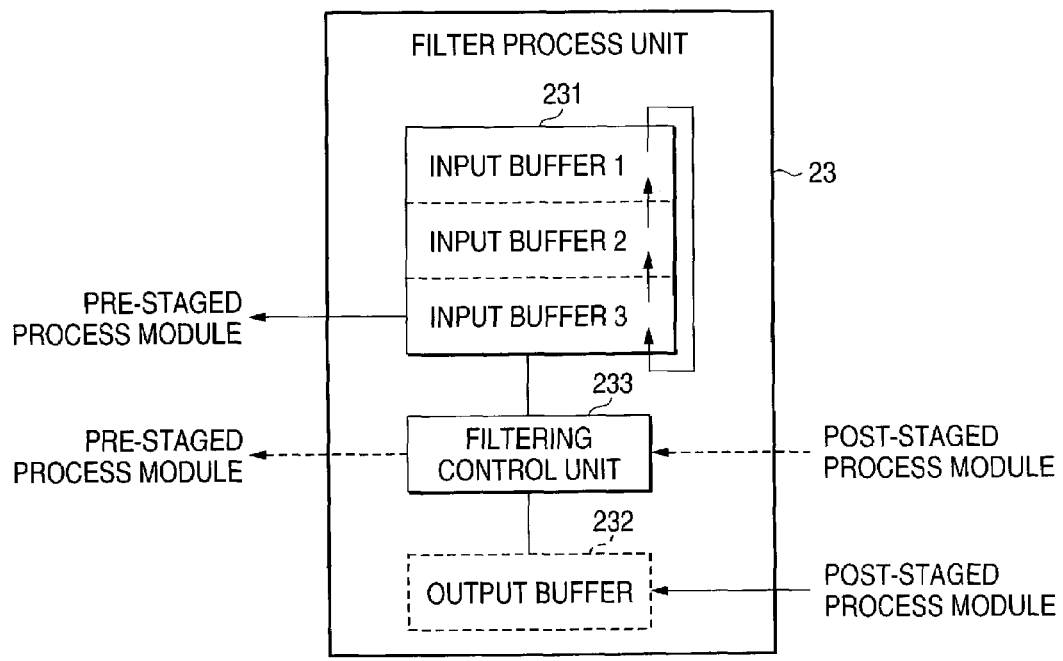
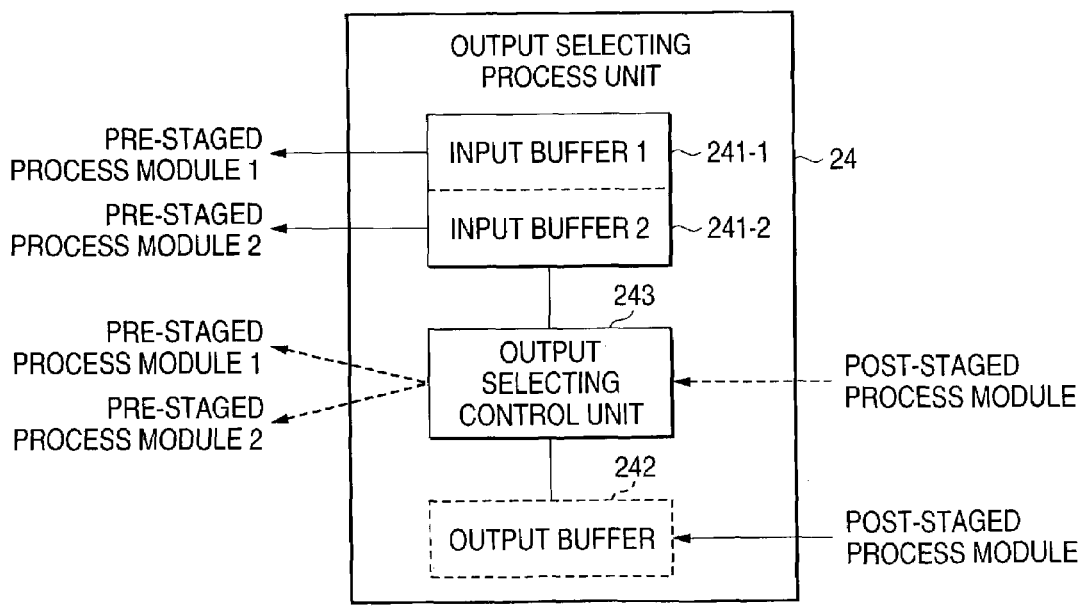

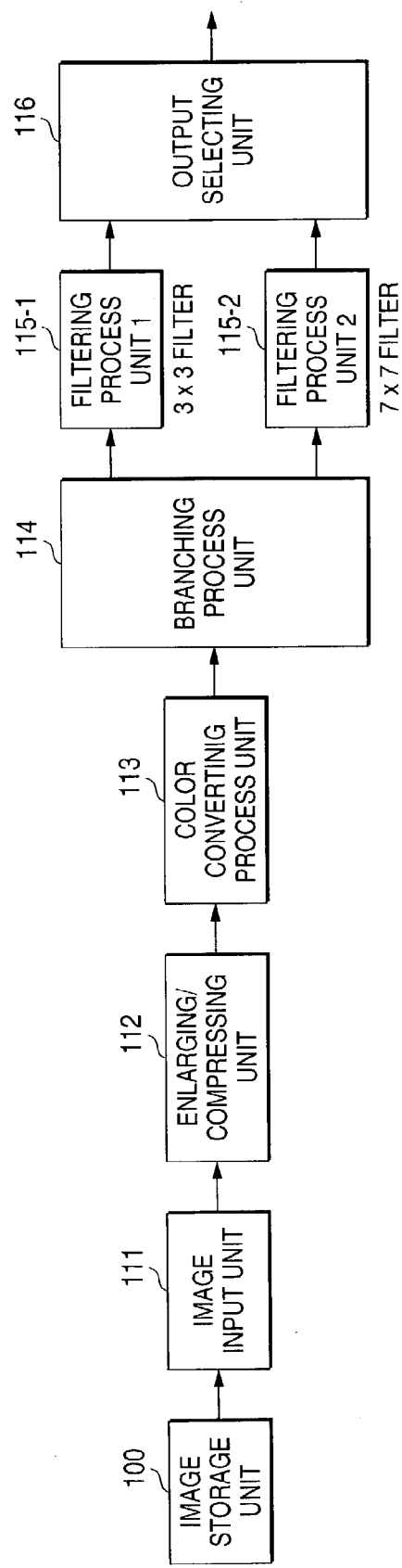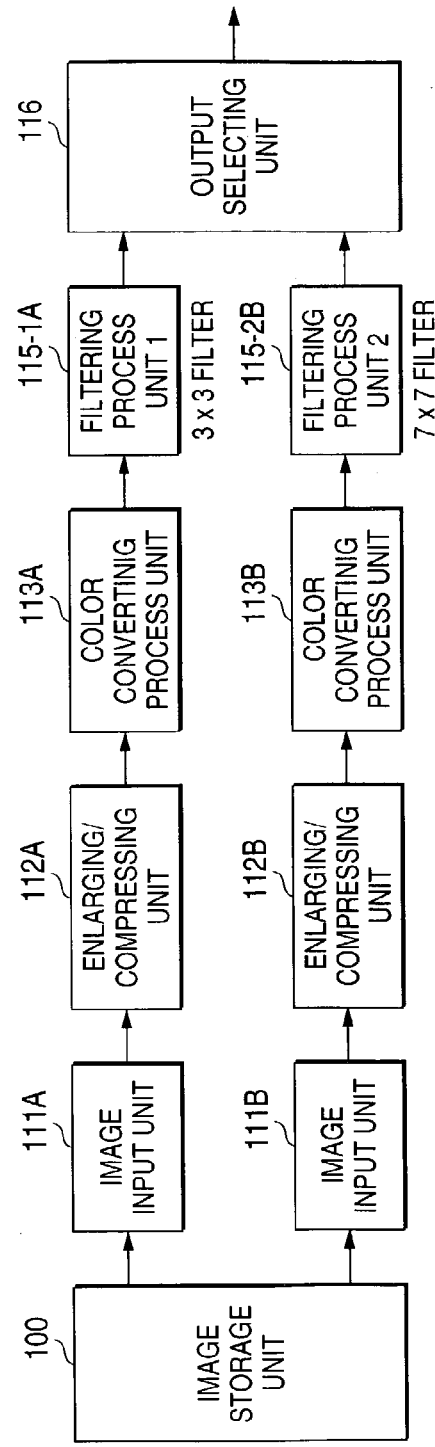

IMAGE PROCESSING APPARATUS AND IMAGE PROCESSING METHOD FOR PROCESSING DIGITIZED IMAGE DATA

BACKGROUND OF THE INVENTION

The present invention relates to an image processing apparatus and an image processing method, for processing digitized image data. More specifically, the present invention is directed to an image producing apparatus and an image producing method, capable of realizing various sorts of image processing functions by preparing a plurality of element/functional image processing modules and by combining these image processing modules with each other.

Techniques capable of providing various sorts of image processing functions by preparing a plurality of element/functional image processing modules and by combing these element/functional image processing modules and by combining thereof with each other are utilized in various systems capable of handling digital images, for example, document editors, drawing tools, image transfer apparatus, printers, and the like. Then, such image processing functions may be provided as image processing libraries in some cases. In the case of these image processing libraries, functions thereof may be utilized by linking the image processing libraries to application programs by which the image processing functions are wanted to be utilized.

In DTP (desk top publishing) systems capable of inputting images, and print systems capable of outputting images, various sorts of image processing operations are carried out with respect to images which should be processed. In these image processing operations, for instance, enlarging operations, reducing operations, rotating operations, affine transformations, color conversions, filtering processes, synthesizing operations, and the like are carried out. When these image processing operations are carried out, these image processing operations may be carried out by employing dedicated hardware in such a case that attributes, image processed contents, sequential orders, parameters of input images are fixed. However, for instance, in such a case that various types (different color spaces, and different bit numbers per bit) are entered, and/or sequential orders of image processed contents and parameters thereof are changed, these image processing operations must be carried out by properly employing image-processing arrangements having more flexible characteristics.

As means capable of satisfying such a requirement, several conventional techniques are proposed, by which desirable image processing operations can be carried out in flexible manners while programmable modules are connected to each other in pipeline modes and/or DAG (Directed Acyclic Graph) modes (for example, the Unexamined Japanese Patent Application Publication Nos. Hei5-260373 and Hei7-105020).

The Unexamined Japanese Patent Application Publication No. Hei5-260373 describes the digital picture signal processing apparatus capable of executing the high calculating process operation in high speeds by arranging this digital picture signal processing apparatus in such a manner that both the respective calculating process contents of a plurality of programmable calculating process units, and the connection modes of the respective programmable calculating process units by way of the network unit can be freely set via the host control means from the external unit. Thus, the digital picture signal processing apparatus may have high degrees of freedom with respect to changes in the functions and changes in the systems.

Further, the Unexamined Japanese Patent Application Publication No. Hei7-105020 describes the pipeline-formed image processing system capable of executing the image processing operation in the flexible manner, since the necessary functional modules are connected in the pipeline shape and initialized in the desirable sequence so as to execute the image processing operation. The operations of this pipeline-formed image processing system are carried out as follows.

In other words, when the connection of the necessary functional modules is completed, the acquisition of the header is requested with respect to the last-positioned functional module, if required. This request is sequentially traced through the connected modules, and is reached to the image input module located at the top, and the header information of the image to be read is returned. After each of the modules rewrites the information of the portion changed by the own module, this module transfers the rewritten information to the post-staged module. For instance, in such a case that a size of an input image is defined by (1000×1000) pixels, and a reducing process module capable of reducing the above-described image size into (500×500) pixels is contained in the processing pipeline, this reducing process module changes the size information (1000×1000 pixels) contained in the header information which is transferred from the pre-staged module into another size information (500×500 pixels), and, transfers this changed size information to the post-staged module.

While such an image processing operation is sequentially repeated, the last-positioned process module finally outputs to the external unit, the header information of the image which is outputted by this image processing pipeline. Next, the data processing operation is carried out based upon the acquired header information and the like. Similar to the header information processing operation, this data processing operation is performed in such a manner that when a constant amount of data is requested to be outputted with respect to the last-positioned module, this last-positioned module requires the pre-staged module to input such an image data required for this data processing operation. This request is traced back to the pre-staged module so as to be transferred to the image input module in a similar manner, the necessary image data is read out form the image input module, and, this read necessary image data is transferred to the post-staged process module. Then, while this image data is sequentially processed, the processed image data is finally outputted form the last-positioned process module.

When the above-explained image processing operation is carried out as to the final image, or the necessary image portion, since the processing pipeline is no longer required, the completion of the image processing operation is requested with respect to the last-positioned process module. Similar to the header information acquiring operation and the above-described process operation, this completion request is similarly traced back to the connections of these process modules, and thereafter, is reached to the frontmost image input module. Then, this image input module releases the resources employed in the process operation, and releases the own module, and returns the control to the post-staged module. This post-staged module to which the control is returned similarly performs such a process operation for releasing the resources and the own module, and further, returns this control to the post-staged module. At such a time instant when releasing of the resources/own module as to the last-positioned module is accomplished, all of the image processing operations are accomplished.

The above-described conventional technique described in the Unexamined Japanese Patent Application Publication No. Hei7-105020 implies that the simulation system for the multiple processing pipeline constructed by the single processor, which is utilized in such an operating system (OS) as UNIX (registered trademark), is applied to technical fields such as an image processing field. Then, more specifically, in this image processing field, since a single processing unit is limited to a portion of an image, for example, one line of an image is limited to be processed, each of the process modules can extremely reduce memory areas used to hold image-processed data.

As a result, this conventional technique can provide the low-cost image processing apparatus capable of executing the complex image processing operations with using the small memory capacity. Alternatively, in the case that such an image processing apparatus is operable on an operating system for supporting a virtual memory, since "swap out" caused by a shortage of memory capacity can be suppressed to a minimum value, this image processing apparatus can execute the image processing operation in a high speed.

Furthermore, as another conventional technique, the following image processing apparatus is proposed (see the Unexamined Japanese Patent Application Publication No. Hei8-272981). That is, for instance, in such a process operation that an entire input image is required in order to obtain 1 line of an output image, e.g., in a 90-degree rotating process operation, or in such a case of branching modules in which an input image is outputted to a plurality of process modules, when buffering of the entire image is ended, an ending process operation is carried out with respect to a pre-staged module. As a consequence, while a necessary memory resource can be suppressed to a minimum resource mount, the image can be processed in high speeds.

In the case that an image processing apparatus is arranged by which the desirable complex process operations can be carried out by combining the above-explained element/functional modules with each other in an arbitrary manner, as a very specific/important module, there is a branching module for outputting an input image to a plurality of processing modules. Although there are many process operations in which all of these process operations defined from an input process operation up to a final process operation may be carried out without executing a branching operation one time, such a branching module is required in the below-mentioned pipeline process operation.

For example, this pipeline process operation is realized in an adaptive filtering process operation in which filtering results obtained by executing a filtering process operation in different kernel sizes are compared with each other, and a filtering output is determined based upon this comparison result. Concretely speaking, as indicated in FIG. 12, while this process module contains an image input unit 111, an enlarging/reducing process unit 112, a color converting process unit 113, a branching process unit 114, filtering process units 115-1/115-2, and an output selecting unit 16, the adaptive filtering process operation is carried out with respect to image data which is stored in an image storage unit 100 and is to be processed.

In such a pipeline process operation, if the branching module is not used, as shown in FIG. 13, such a method is employed. That is, two sets of pipeline systems "A" and "B" are separately formed so as to perform the pipeline process operation, and a module for integrating these pipeline process results is formed. However, in the case of employing such an arrangement for separately forming the two pipeline systems, the completely same image input process, enlarging/reducing process, and color converting process operations are carried out two times respectively, as compared with such a case that the branching module of FIG. 12 is employed. As a result, large waste aspects will occur in view of resources/processing speeds.

Because of these reasons, the pipeline system constructed of the branching module, as indicated in FIG. 12, may constitute the effective method. The previously-explained Unexamined Japanese Patent Application Publication No. Hei7-105020 describes that branching of the pipeline system is performed, and/or the "fan-out" pipeline portion is present. However, detailed operations thereof are not described. Therefore, the following pipeline branching method is merely realized from the contents described in this publication. That is, while the entire image is buffered, the required intervening process results are merely outputted to the respective branching destinations.

Further, the above-described Unexamined Japanese Patent Application Publication No. Hei8-272981 discloses the following techniques. That is, by releasing the process module located at the pre-stage of the branching module, at least such a resource which has already become useless may be released. Also, while either the flag or the counter is employed which are used to check as to whether or not the processing operations are accomplished in all of a plurality of branched output destinations, if all of these process operations are accomplished, then the buffers and the like held by this branching module are released and the own branching module is released. However, as apparent from this operation explanation, the entire image corresponding to the intervening process results must be buffered in the branching module.

As previously described, although the branching module is very important in order that the arbitrary modules are combined with each other to realize the desirable complex process operation, the conventional techniques must buffer the entire image of the intervening process results obtained in the process modules up to the branching module, so that a large number of memories is necessarily required. As a result, this buffering necessity may cause one of factors for mitigating the merits of the pipeline type processing operation (including DAG type pipeline), namely highspeed processing operation can be carried out using a small number of memories.

SUMMARY OF THE INVENTION

The present invention is made to solve the above-described problems, and therefore, has an object to provide such an image processing apparatus and an image processing method, by which in a pipeline process operation containing a branching module, required image data can be outputted in a high speed to arbitrary branching destinations by buffering only a portion of intervening process results entered into this branching module, or completely not by buffering this process result portion.

To achieve the above-described object, according to the present invention, in a pipeline process in which a plurality of process modules (process device) containing an image inputting process module for inputting process-purposed image data, and a branching process module capable of outputting the inputted image data to a plurality of output destinations are connected to each other in a pipeline mode, each of the plural process modules is provided with a function capable of re-executing a process operation from a head of the process-purposed image data, and also the branching process module is provided with a function capable of managing at least an arbitrary number of branching destinations.

Since each of the plural process modules is equipped with such a function capable of re-executing the process operation from the head of the process-purposed image data in the pipeline process operation, the process-purposed image data can be again read. As a consequence, in the case that such a process operation for using an image data analysis result in a post-staged process operation is realized as a program executable on a computer, such process operations which are conventionally executed in plural paths may be realized by a single path. Also, since the branching process module is equipped with the function capable of managing at least an arbitrary number of branching destinations, this image processing apparatus can properly execute an arbitrary number of branching process operations without having a buffer for buffering data of an entire image, and furthermore, can execute the branching process operation at the same speed as that required for buffering image data of an entire image, depending upon a process module connected at a post-stage of this branching process module.

BRIEF DESCRIPTION OF THE DRAWINGS

FIG. 4 is a block diagram for showing an example of an internal arrangement of a filtering process unit.

FIG. 5 is a block diagram for representing an example of an internal arrangement of an output selecting process unit.

FIG. 12 is a block diagram for indicating a combination example of process modules using branching.

FIG. 13 is a block diagram for indicating an example of such a case that the same process operation as that of FIG. 12 is realized without using branching.

DETAILED DESCRIPTION OF THE PREFERRED EMBODIMENTS

Referring now to drawings, various embodiment modes of the present invention will be described.

Figure 1:
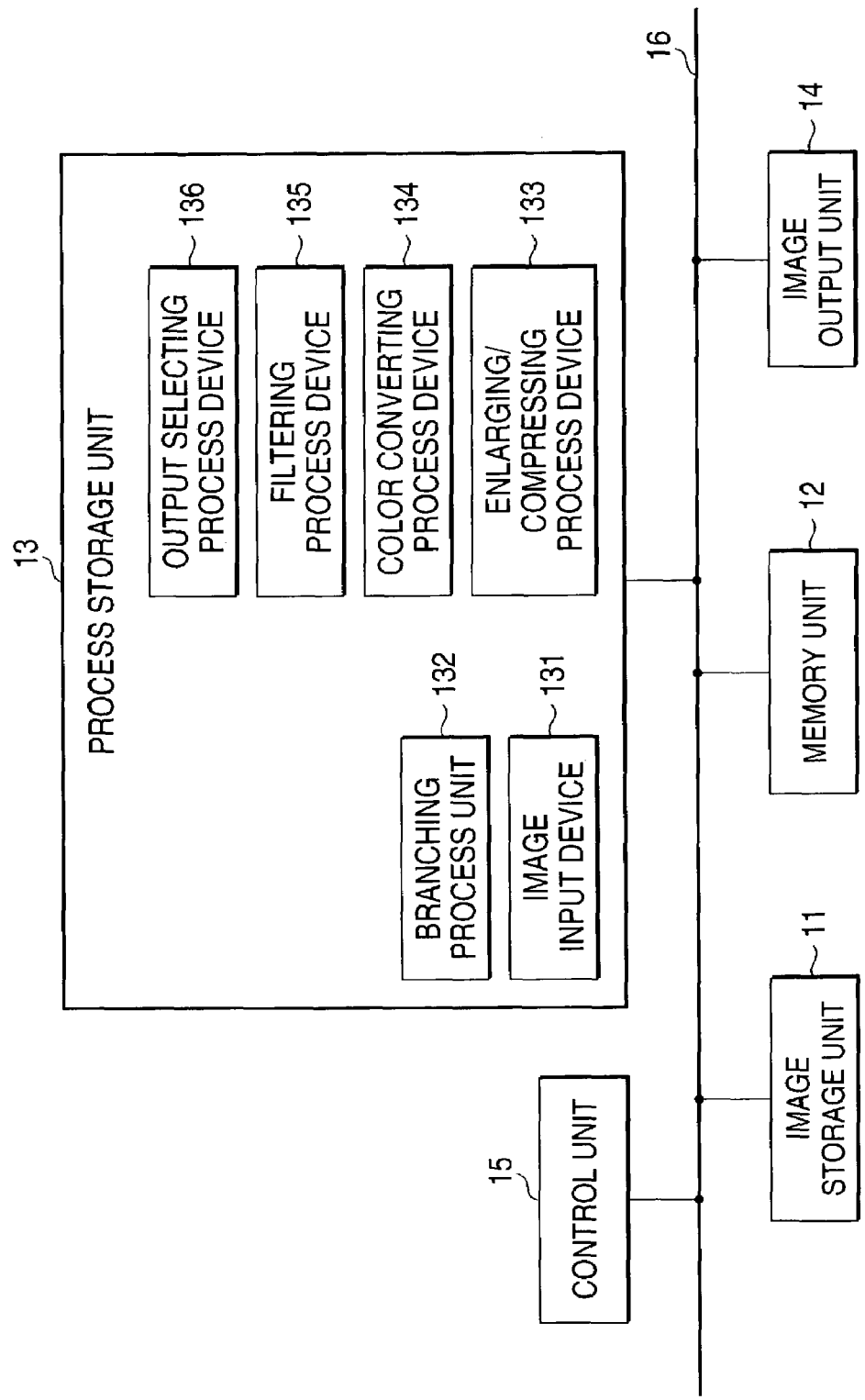
FIG. 1 is a block diagram for indicating an example of an arrangement of an image processing apparatus according to an embodiment mode of the present invention.

FIG. 1 is a block diagram for indicating an example of an arrangement of an image processing apparatus (image processing system) according to an embodiment mode of the present invention. As indicated in FIG. 1, the image processing apparatus according to this embodiment mode is constituted by employing an image storage unit 11, a memory unit 12, a process storage unit 13, an image output unit 14, and a control unit 15 in such a manner that these structural elements are mutually connected via a bus line 16 to each other.

In FIG. 1, the image storage unit 11 stores thereinto digitized image data which corresponds to a subject to be processed. The memory unit 12 stores thereinto the image data held in the image storage unit 11, process regions required to execute various sorts of processing operations, various sorts of calculation intervening results, processing parameters, and the like. It should be noted that the function of the above-described image storage unit 11 may be alternatively expanded so as to be used as the memory unit 12.

The process storage unit 13 contains various sorts of processing means which may execute predetermined process operations with respect to the image data to be processed which is stored in the image storage unit 11, for instance, an image input device 131, a branching process device 132, an enlarging/reducing process device 133, a color converting process device 134, a filtering process device 135, and an output selecting process device 136. Alternatively, the respective process device and also the control unit 15 employed in this process storage unit 13 maybe expanded/operated as a program module within the memory unit 12. Otherwise, these process device and the control unit 15 may be provided as a processing program module operable on a computer. Alternatively, either a portion or an entire portion of these process device and of the control unit 15 may be arranged by employing dedicated hardware. A detailed explanation as to various sorts of process device employed in this process storage unit 13 will be made later.

The image output unit 14 outputs processed results via the bus line 16 to an external unit outside the image processing system shown in the drawing, while these processed results are obtained by processing the image data stored in the image storage unit 11 by way of the various sorts of process device employed in the process storage unit 13. The control unit 15 is constituted by a CPU and the like, and controls the various process operations of the image storage unit 11, the memory unit 12, the process storage unit 13, and the image output unit 14.

Next, as to the various sorts of process device employed in the process storage unit 3, several process operations thereof will now be summarized.

As previously described, the various sorts of process device may be provided as the process program module executable on the computer, or either a portion or an entire portion of these process device may be constituted by using the dedicated hardware. For the sake of a simple explanation in the below-mentioned descriptions, such a case is exemplified in which these various sorts of process device are realized as the processing program modules executable on the computer.

Figure 2:
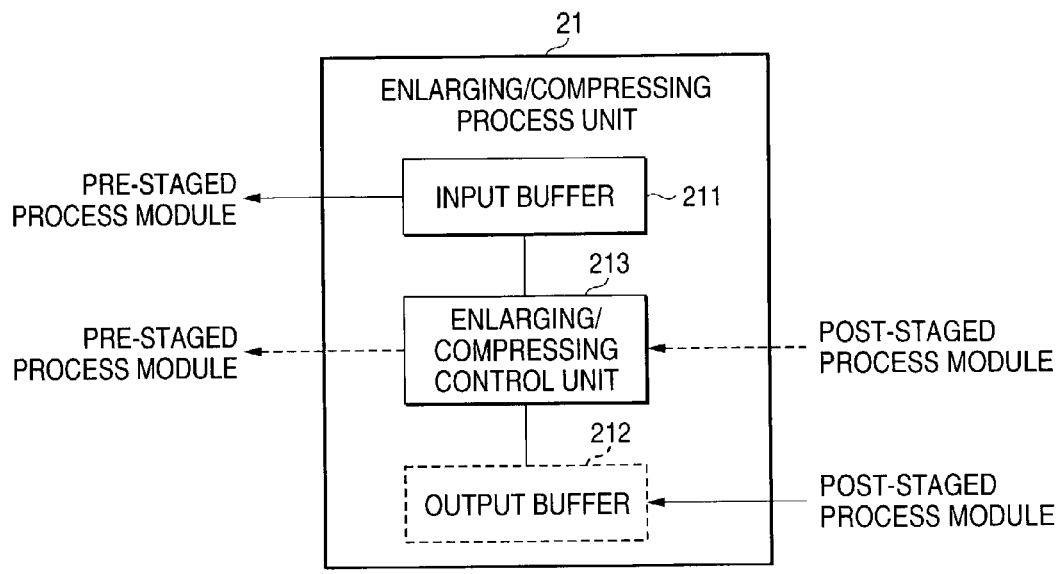
FIG. 2 is a block diagram for showing an example of an internal arrangement of an enlarging/reducing process unit.

FIG. 2 is a block diagram for representing an example of an internal structure of an enlarging/reducing process unit 21 corresponding to one of the processing program modules. This enlarging/reducing process unit 21 corresponds to the above-explained enlarging/reducing process device 133. As apparent from FIG. 2, the enlarging/reducing unit 21 is arranged by containing an input buffer 211, an output buffer 212, and an enlarging/reducing control unit 213. This input buffer 211 is employed so as to buffer an image (image data) entered from the pre-staged module. The output buffer 212 is employed so as to output a processed result to this enlarging/reducing process unit 21. The enlarging/reducing control unit 213 controls the enlarging/reducing process operation.

In the enlarging/reducing process unit 21, in FIG. 1, scaling factors of enlarging/reducing operations are instructed from the control unit 15 when a module is produced; necessary information and the like are derived from the process storage unit 13; and, the derived necessary information is produced as a processing program module on the memory unit 12. When this processing program module is produced, connection information to the pre-staged module is given from the control unit 15 to the enlarging/reducing control unit 213; based upon this connection information, this enlarging/reducing control unit 213 requests the pre-staged module to acquire image information to be inputted so as to acquire such an information as an image size and a bit number; and thus, the enlarging/reducing control unit 213 forms the input buffer 211 required to execute the process operations on the memory unit 12.

Next, the enlarging/reducing process unit 21 calculates output image information based on the scaling factor information given from the control unit 15, and thus, forms the output buffer 212 on the memory unit 12 in order to output such an image which is enlarged/reduced to the post-staged module. As one example, assuming now that the input image is such an image made of (1000×1000) pixels in which one pixel is constructed of 8 bits; the enlarging/reducing scaling factors are (0.6, 1.0); and also, the image output unit per one time is selected to be 1 line, the enlarging/reducing control unit 213 may form both the input buffer 211 having the buffering capacity of 100 bytes and also the output buffer 212 having the buffering capacity of 600 (=1000×0.6) bytes on the memory unit 12.

When an output request is received from the post-staged module in the enlarging/reducing process unit 21 constituted in the above-described manner, this output request is notified to the enlarging/reducing control unit 213. As a result, the enlarging/reducing unit 213 issues an output request of an image with respect to the pre-staged module. The pre-staged module writes such an image data of 1 line (=1000 bytes) into the own output buffer and returns this 1-line image data to the enlarging/reducing control unit 213 in response to this image output request. At this time, the enlarging/reducing control unit 213 copies this result to the input buffer 211.

Next, the enlarging/reducing control unit 213 writes into the output buffer 212 in accordance with the enlarging/reducing scaling factor, such an image data which is produced by reducing the data of the input buffer 211 by the reducing scaling factor of 0.6, and transfers this result (reduced image data) to the post-staged module. The post-staged module copies the transferred output data to the own input buffer. It should be understood that since the reducing process technique is well known in this technical field, a detailed description thereof is omitted in this specification. A process operation in which an image obtained by reducing an input image by the reducing scaling factor of (0.6, 1.0) is outputted may be carried out by repeatedly executing such a process operation plural times equal to a total line number of the image (namely, 1000 times in this embodiment).

For the sake of easy explanations, the enlarging/reducing process unit 21 is formed/held both the input buffer 211 and the output buffer 212. Alternatively, this enlarging/reducing process unit 21 may be arranged in such a manner that the output buffer 212 is formed by the post-staged module, and this formed output buffer 212 is transferred to the enlarging/reducing process unit 21 together the output request so as to be written thereinto. In this alternative case, the output buffer 212 is no longer required in the enlarging/reducing process unit 21. Similarly, when the output request is issued, if the input buffer 212 of the enlarging/reducing process unit 21 is transferred to the pre-staged module, then the output buffer is not required also in this pre-staged module. As a result, since the copy operations between the input/output buffers are no longer required during input/output operations, the processing speed may be improved.

In the below-mentioned descriptions as to the respective process program modules, although an output buffer is illustrated in the block diagrams, such an assumption is made in which this output buffer is transferred from the post-staged module.

Figure 3:
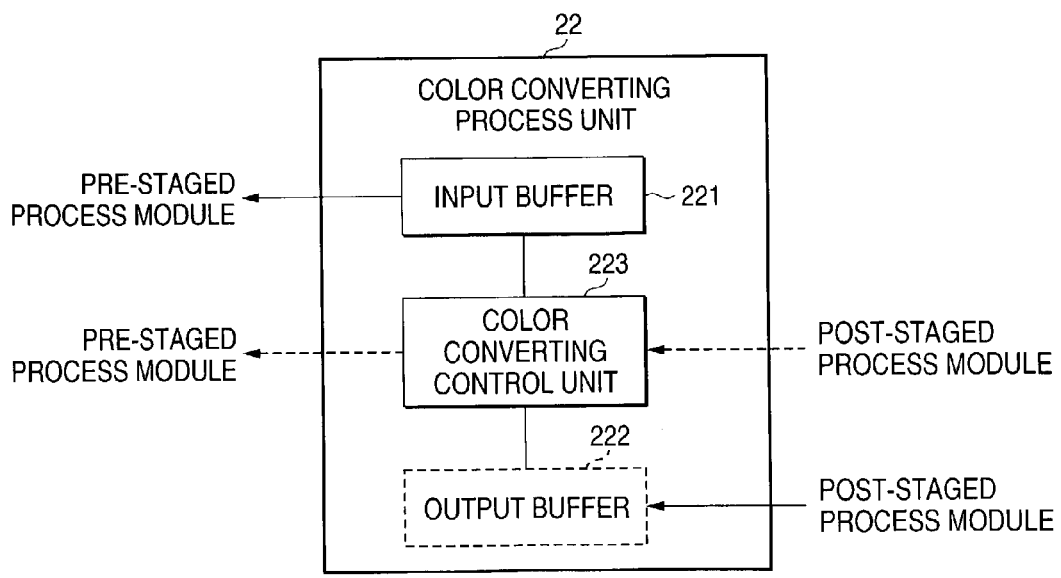
FIG. 3 is a block diagram for representing an example of an internal arrangement of a color converting process unit.

FIG. 3 is a block diagram for representing one example of an internal arrangement of a color converting process unit 22 which executes a color converting process operation of an input image by employing a lookup table (LUT) and a color conversion matrix. This color converting process unit 22 corresponds to the color converting process device 134 of FIG. 1. Similar to the enlarging/reducing process unit 21, this color converting process unit 22 is arranged by an input buffer 221 for storing thereinto an image (image data) entered from the pre-staged module, an output buffer 222 for outputting a color-converting process result to the post-staged module, and a color conversion control unit 223 for controlling the color converting process operation.

In FIG. 1, the color converting process unit 22 is formed as a program module on the memory unit 12 in such a manner that a process parameter, for example, an LUT and a matrix is instructed from the control unit 15 when the program module is formed, and information required to process this process parameter is derived from the process storage unit 13. When this processing program module is produced, connection information to the pre-staged module is given from the control unit 15 to the color converting control unit 223; based upon this connection information, this color converting control unit 223 requests the pre-staged module to acquire image information to be inputted so as to acquire such an information as an image size and a bit number; and thus, the color converting control unit 223 forms the input buffer 221 required to execute the process operations on the memory unit 12.

In this color converting process unit 22, when the output buffer 222 is transferred from the post-staged module and an output request is received, the color converting process unit 22 transfers the input buffer 221 to the pre-staged module and issues an output request, and thereafter executes either the LUT-process operation or the matrix process operation with respect to the image data stored in the input buffer 221. Then, the color converting process unit 22 writes this processed image data into the output buffer 222, and returns this processed image data to the post-staged module.

FIG. 4 is a block diagram for showing an example of an internal arrangement of a filtering process unit 23 which executes a convolution filtering process operation. This filtering process unit 23 corresponds to the filtering process device 135 of FIG. 1. As apparent from FIG. 4, the filtering process unit 23 is constituted by employing a plurality of input buffers 231, an output buffer 232, and also, a filtering control unit 233. The plural input buffers 231 correspond to a filter coefficient size. The output buffer 232 is used to output a filtering-processed result to the post-staged module. The filtering control unit 233 controls a filtering process operation.

Figure 7:
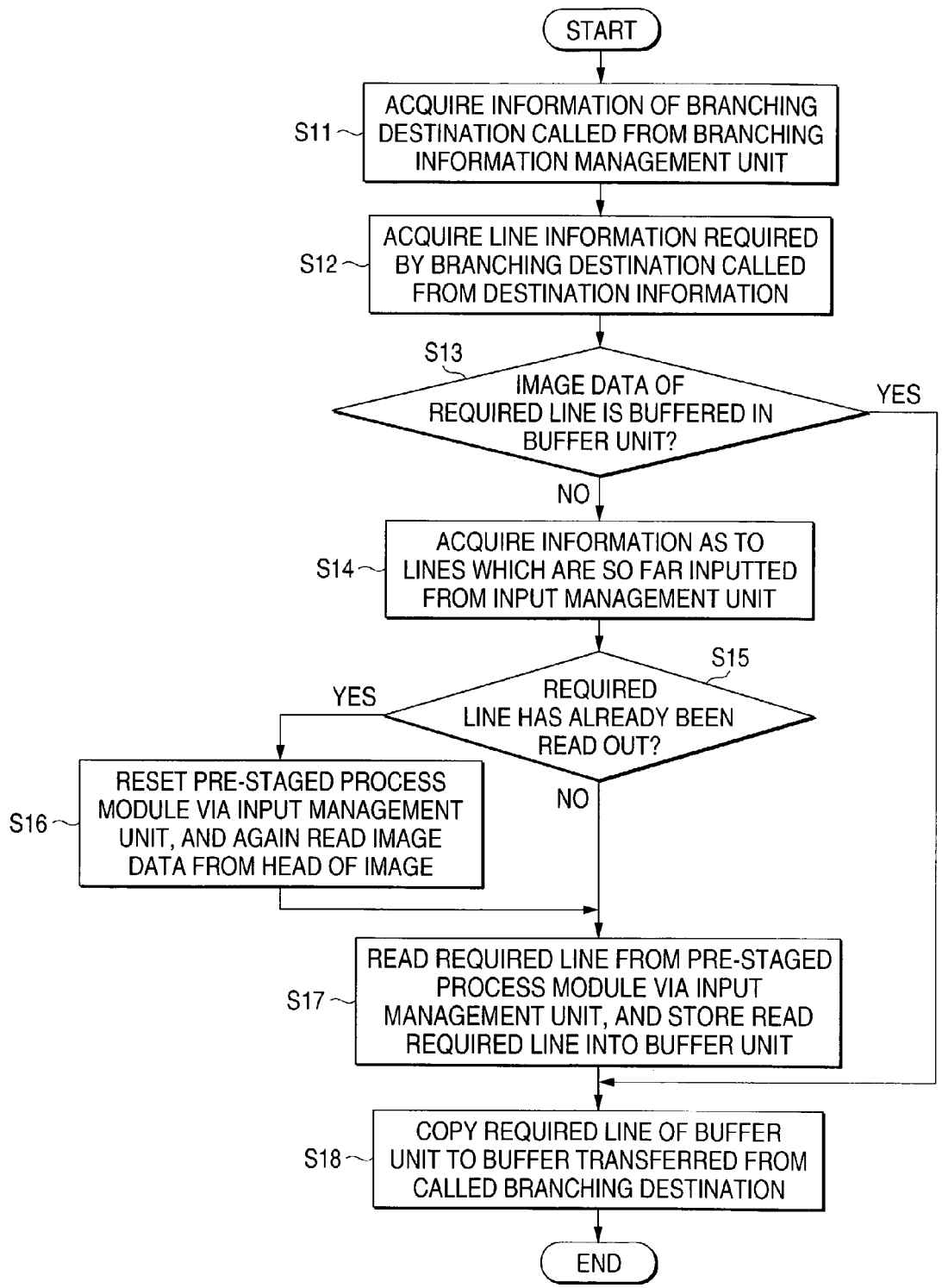
FIG. 7 is a flow chart for describing operations of the branching process unit according to the first embodiment.

FIG. 7 represents such an arrangement for assuming that the filtering process operation of, for example, 3×3 size is carried out. In the case that the control unit 15 instructs a 3×3 filter coefficient so as to form the filtering process unit 23 in FIG. 1 when a module is produced, the filter control unit 233 secures a storage capacity on the memory unit 12, by which input image data for 3 lines may be stored as the input buffer 231, and also calls the pre-staged module from the connection information which is transferred from the control unit 15 when the module is produced. Therefore, the filtering control unit 233 writes the input image data of the first line into the second input buffer 231, and also copies this input image data to the first input buffer 231.

When the output buffer 232 is transferred from the post-staged module and an output request is received, the filtering control unit 233 transfers a third input buffer 231 to the pre-staged module so as to write image data of a second line into this third input buffer 231, and sequentially convolutes the image data for the first to third lines (namely, three lines) stored in these input buffers 231 with the 3×3 filter coefficient in order to calculate output data, and writes this calculated output data into the output buffer 232.

When this process operation is carried out as to 1 line of the image data, since an output result (image data) for 1 line is stored in the output buffer 232, the filtering control unit 233 returns this output result to the post-staged module. Thereafter, in the input buffers 231, the second data is copied to the first input buffer, and the third data is copied to the second input buffer so that the filtering control unit 233 is prepared for the process operation of the next line.

FIG. 5 is a block diagram for showing an example of an internal arrangement of an output selecting process unit 24. This output selecting process unit 24 receives two sets of input images, and selects any one of pixel values to output the selected pixel value under a certain condition. This output selecting process unit 24 corresponds to the output selecting process device 136 of FIG. 1. As apparent from FIG. 5, the output selecting process unit 24 is arranged by employing two input buffers 241-1 and 241-2; an output buffer 242; and an output selecting control unit 243. The two input buffers 241-1 and 241-2 correspond to the two input images, respectively. The output buffer 242 is employed so as to output a process result to the post-staged module. The output selecting control unit 243 controls an output selecting process operation.

The output selecting process unit 24 is formed as a processing program module on the memory unit 12 in such a manner that in FIG. 1, a process parameter such as a selection condition is instructed from the control unit 15 when a module is formed, such an information required to process this process parameter is derived from the process storage unit 13, and this output selecting process unit 24 is formed. When this processing program module is produced, connection information to the two pre-staged modules is given from the control unit 15 to the output selecting control unit 243; based upon this connection information, this output selecting control unit 243 requests the pre-staged modules to acquire image information to be inputted so as to acquire such an information as a image size and a bit number; and thus, the output selecting control unit 243 forms input buffers 241-1 and 241-2 required to execute the process operations on the memory unit 12.

In this output selecting process unit 24, when an output request is transferred from the post-staged module to the output buffer 242 and is accepted, both the first input buffer 241-1 and the second input buffer 241-2 of the input buffer 241 are transferred to the respective two pre-staged modules so as to issue an output request, and the image data is written into the input buffers. Thereafter, based upon the selection condition instructed from the control unit 15, the output selecting process unit 24 sequentially selects pixel values from the image data which are stored in the two input buffers 241-1 and 241-2, and writes the selected pixel value into the output buffer 242, and also, returns this selected pixel value to the post-staged module.

As previously explained, the normal process operations as to the various sorts of process modules are summarized. Alternatively, each of these process modules may be equipped with other functions than the above-described normal process operations, namely may be equipped with a reset (re-initializing) operation and a skip operation. In the reset operation, the process operation which is executed is canceled, and the process operation is again started from the head of the image. In the skip operation, only the internal condition is changed without executing the process operation in order to omit the process operation of the unnecessary data.

For instance, when a reset instruction is given from the post-staged module to the filtering process unit 23 of FIG. 3, the filtering control unit 233 similarly issues the reset instruction with respect to the pre-staged module, and thereafter, sets a processed-line-number counter to zero, which is held in this filtering control unit 233. Also, this filtering control unit 233 calls the pre-staged module so as to write the image data of the first line into the second input buffer 231, and copies this image data of the first line to the first input buffer 231. Since the filtering control unit 233 is operated in such a manner, this filtering process unit 23 may be recovered to the same condition as when this filtering process unit 23 is formed by the control unit 15.

Also, for instance, when such an instruction for skipping a process operation for image data of K lines is given from the post-staged module with respect to the color converting process unit 22, the color converting control unit 223 similarly issues a skipping instruction for the image data of K lines with respect to the pro-staged module, and thereafter, adds "K" to the processed-line-number counter held in this color converting control unit 223.

The above-described reset/skip functions may be required, or not, depending upon a combination of required process operations, and a buffering capacity of a buffer unit which can be held in a branch module. The require/not-require conditions of these reset/skip functions are different from each other, depending upon the respective embodiments in the following explanations. However, while such a fact that each of modules owns such functions is defined as an initial condition, the following explanations will be made without any remarks.

While the process operations as to the various sorts of process modules are summarized, the present invention is directed to branching process operations which are required in the case that a pipeline process operation is carried out by combining these plural process modules with each other in a complex manner, including an image input module for reading out an image from the image storage unit 11.

Referring now to embodiments, an arrangement and operations of a branching process unit 25 which constitutes a featured portion of the present invention will be described in detail. This branching process unit 25 corresponds to the branching process device 132 of FIG. 1.

First Embodiment

Figure 6:
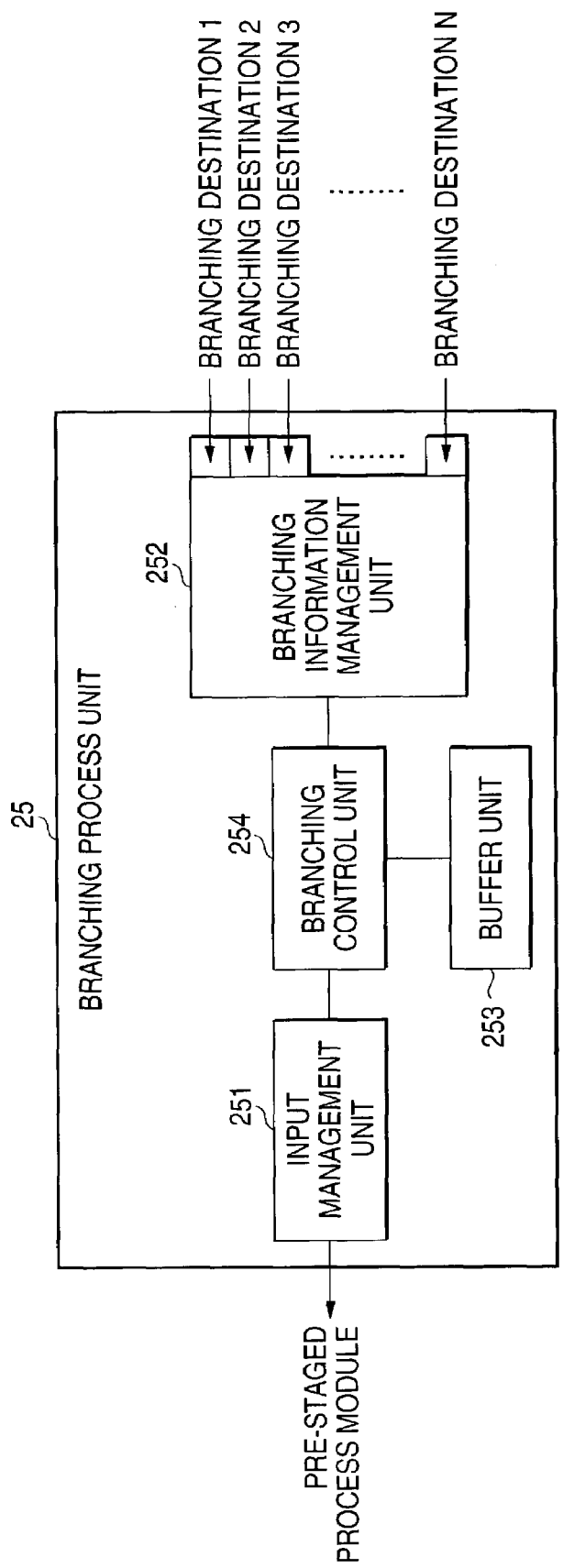
FIG. 6 is a block diagram for showing an example of an internal arrangement of a branching process unit according to a first embodiment of the present invention.

FIG. 6 is a block diagram for representing one example of an internal structure of the branching process unit 25 according to a first embodiment of the present invention. As apparent from FIG. 6, the branching process unit 25 is arranged by employing an input managing unit 251, a branch information managing unit 252, a buffer unit 253, and a branch control unit 254 for controlling the respective units. The input managing unit 251 manages input conditions derived from the pre-staged module. The branch information managing unit 252 manages branching destination information with respect to the respective plural branching destinations. The buffer unit 253 temporarily stores thereinto the entered image data.

In FIG. 1, while the control unit 15 reads out the branching process device 132 from the process storage unit 13, this control unit 15 forms a program module of the branching process unit 25 by using both the connection information to the pre-staged module and an upper limit value of the buffering capacity of the buffer unit 253. As a result, the respective units in the branching process unit 25 are operated in the following manners under control of the branching control unit 254.

The input control unit 251 holds the connection information to the pre-staged module and a counter of read line numbers, and initializes the line number counter to zero. The branch information managing unit 252 forms a branching destination management list which can hold plural sets of indexes and line number counters, and initializes the branching destination management list to an empty state, since there is no branching destination at this stage. The indexes are employed in order to identify the branching destinations. The line number counters count the line numbers read by these branching destinations. The buffer unit 253 forms a list of line buffer pointers so as to form/manage line numbers of buffers which can be buffered and can be calculated based upon an upper limit value of a storage capacity. At this stage, since none of image data is entered in this buffer unit 253, this buffer unit 253 is initialized to the empty state.

Subsequently, when the control unit 15 instructs the branching process unit 25 to newly form a branching destination, the branching control unit 254 controls the branching information management unit 252 so as to form a set of indexes having different values every branching destination, and of line number counters initialized to zero, and also registers this formed set into the above-explained branching destination management list, and returns the above-described indexes to the control unit 15. This operation is repeatedly carried out plural times equal to a total number of necessary branches.

Assuming now that the branching process unit 25 is formed in this manner, and the modules are further connected thereto, and the entire process operation is constructed as, for example, a pipeline shown in FIG. 12, branching operations of the branching process unit 25 when this branching process unit 25 is called from the post-staged module will now be explained in detail in accordance with a flow chart of FIG. 7.

When a read request of image data is issued from a certain branching destination, the branching control unit 254 acquires an index of the branching destination, and seeks the branching destination management list of the branching information management unit 252 based upon this index information in order to acquire such a branching destination information having the same index as the above index (step S11). Next, since the branching control unit 254 reads out a value of the line number counter from this acquired destination information, the branching control unit 254 acquires line information which is subsequently needed by this branching destination (step S12). For instance, in the case that the value of the line number counter is equal to zero (initial value), it can be understood that this branching destination requires a first line. Also, in the case that the value of the line number counter is equal to "10", it can be understood that this branching destination requires an eleventh line.

Next, the branching control unit 324 seeks the list of the line buffers of the buffer unit 253 to check as to whether or not the required line which is judged in the step S12 is buffered (step S13). If the requested line is buffered, then the process operation of the branching process unit 25 is advanced to a step S18, whereas if the requested line is not buffered, then the branching control unit 324 acquires the count value of the line number counter which has already been read out from the input management unit 321 (step S14).

Next, the branching control unit 324 judges as to whether or not the required line has already been read out from this acquired value of the input line number (step S15). When the required line has already been read, since this required line is not buffered also in the buffer unit 253, the branching control unit 324 resets the pre-staged module based upon the connection information to the pre-staged module held by the input management unit 251, and sets the counter value of the input line number counter to zero, so that the lines can be again read from the head line of the image (step S16).

If the required line has not yet been read from the count value of the input line number counter, then since such a condition of (inputted line<required line) must be established at this stage, the branching control unit 324 calls the pre-staged module via the input management unit 251, and reads out the required line to store this required line into the buffer unit 253 in such a way that either the branching control unit 324 provisionally reads lines until the required line is reached, or unnecessary lines are skipped in the case that the module connected to the pre-staged side owns the skip function (step S17). At this stage, since the required line is stored in the buffer unit 253, the branching control unit 324 copies this line data and returns it to the output buffer transferred from the called branching destination (step S18). As a result, since the read request issued from this branching destination is processed, a series of the process operations are accomplished.

Although the detail process operation is omitted in order to simplify the explanations, the process operation defined in the step S17 is given as follows: That is, when the required line is read to be stored in the buffer unit 253, if the buffer unit 253 cannot store thereinto a new line since the present capacity reaches a previously designated upper limit capacity, then the lines which have already been stored are deleted from the buffer unit 253. In this case, there are several systems capable of deleting which line from the buffer unit 253. For instance, a system capable of sequentially deleting the image data in this order of the image data lately-stored in the buffer unit 253, and also, another system capable of sequentially deleting such an image data which is located in the vicinity of a head of an image from the previously-stored image data may be employed.

As previously explained, in the pipeline process operation containing the branching process unit 25 functioning as one of the process modules, since the input management unit 251 for managing the input condition, the branching information management unit 252 for managing the information as to the branching destinations, the buffer unit 253 capable of designating the upper limit capacity, and also, the branching control unit 254 for controlling the entire branching process unit are employed with the above-described branching process unit 25, this branching process unit 25 can properly execute an arbitrary number of branching process operations without having buffer units capable of buffering an entire image. As a consequence, this branching process unit 25 may execute the branching process operation under small memory consumption.

It should also be under stood that the branching process operation may be controlled without resetting the pre-staged module at all, depending upon a certain sort of process module which is coupled to the post-staged module. As a result, the branching process operation may be carried out at the substantially same process speed as that of such a case that the entire image is buffered. This example will be subsequently explained as a second embodiment.

Second Embodiment

As indicated in FIG. 12, in this second embodiment, a description is made of such a pipeline example in which while a plurality of process modules are connected to each other, a branching process operation is carried out only by employing a buffer having a limited buffering capacity even when a process module connected to a pre-staged process module is not equipped with a reset/skip function.

As previously explained in FIG. 5, the output selecting process unit 24 acquires images in the unit of one line from two sets of pre-staged process modules, and selects any one of these input images under a specific condition to output the selected image for 1 line. In the pipe line process operation of FIG. 12, both a filtering process unit 1 (115-1) for performing a 3×3 filtering process operation and another filtering process unit 2 (115-2) for executing a 7×7 filtering process operation are connected to the output selecting process unit 24 as the pre-staged process modules.

As explained in the operations in the process filtering process unit 23 of FIG. 4, in the case of the 3×3 filtering process operation, these output image data up to the 1-line preceding output image data must be read. Similarly, in the case of the 7×7 filtering process operation, these output image data up to the 3-line preceding output image data must be read.

In other words, when the output selecting process unit 24 executes the output selecting process operation every 1 line, and furthermore, calls the filtering process unit 1 (115-1) at first, the branching process unit 25 receives an output request only in an image data range of 3 lines which correspond to an overlap portion between the 3-line preceding image data read by the filtering process unit 2 (115-2) and the 1-line preceding image data read by the filtering process unit 1 (115-1). As a consequence, the buffer unit 253 employed in the branching process unit 25 may merely buffer the 3-line image data, so that the branching process unit 25 no longer resets the pre-staged process module, and may execute the branching process operation at the same processing speed as that required for such a case that the entire image is buffered.

Figure 8:
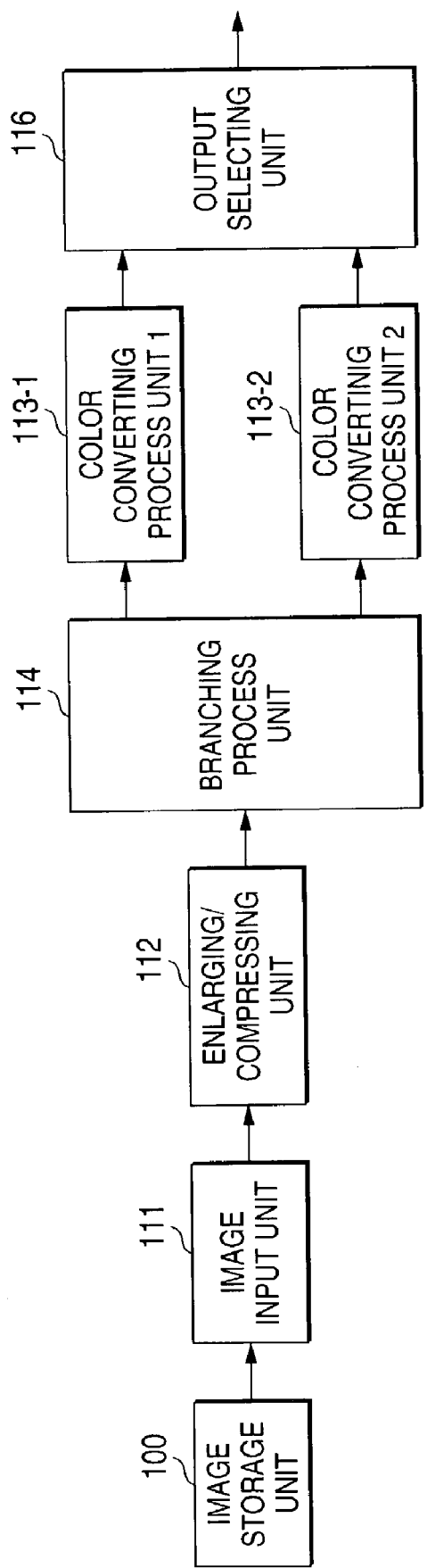
FIG. 8 is a block diagram for indicating a combination example of process modules according to a second embodiment of the present invention.

Also, as indicated in FIG. 8, the following case is considered. That is, a pipeline process operation is carried out which requires such a process sequence that different color converting process operations are executed instead of the filtering process operation, and a color conversion result is selected. It should be noted that the same reference numerals shown in FIG. 12 will be employed as those for denoting the same, or similar structural elements indicated in FIG. 8.

As previously explained in FIG. 3, since the operations of the color converting process unit 22 merely require the same input lines as the output lines, the lines required by the color converting process unit 1 (113-1) are completely identical to the lines requested by the color converting process unit 2 (113-2). As a consequence, the branching process unit 25 (namely, branching process unit 114 in FIG. 8) merely buffers the image data of 1 line, and no longer requires to reset the pre-staged process module, and thus, can execute the branching process operation at the same speed as that required for such a branching process operation that the entire image is buffered.

Figure 9:
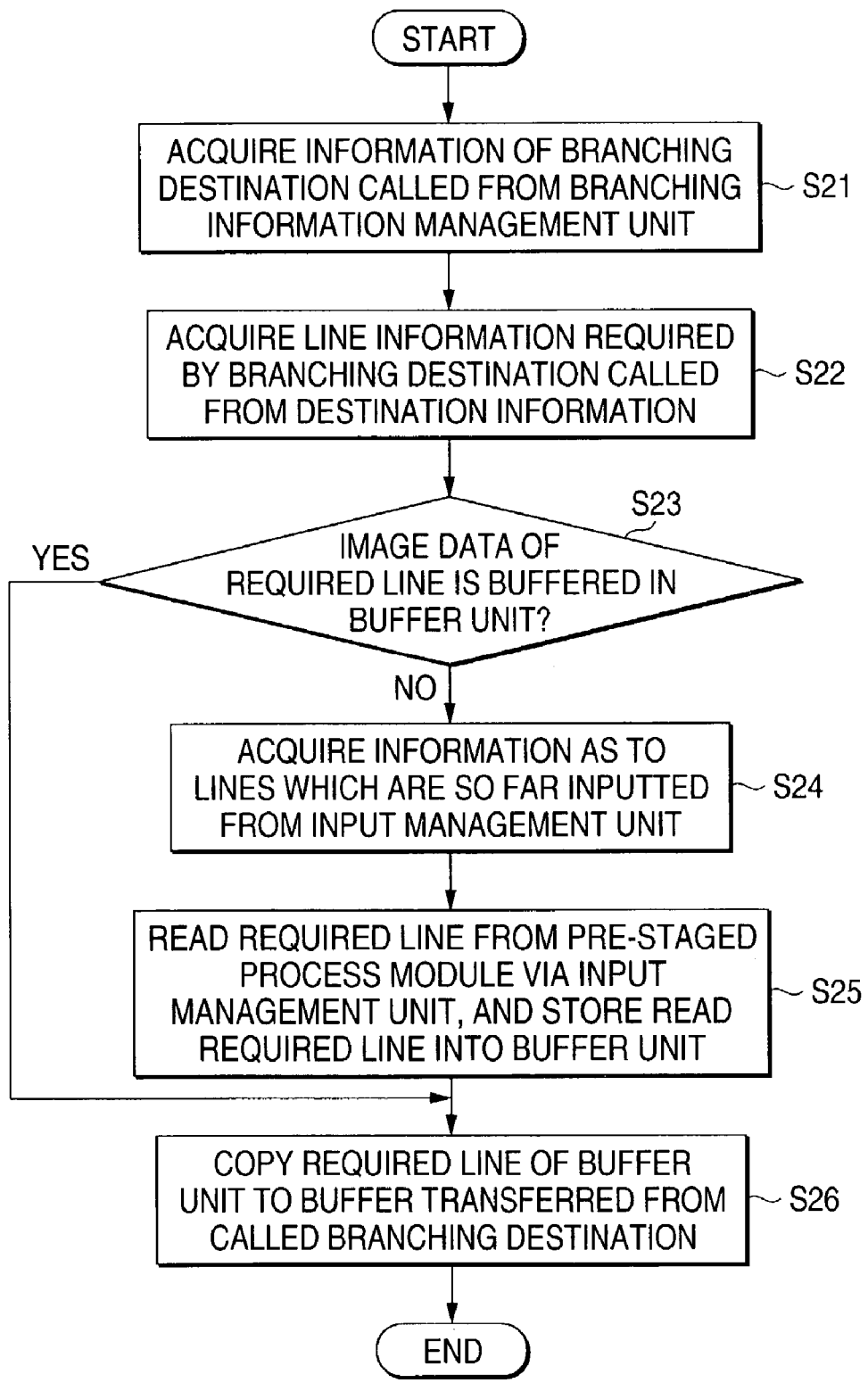
FIG. 9 is a flow chart for explaining operations executed in the combination example of the process modules according to the second embodiment.

Referring now to a flow chart shown in FIG. 9, branching process operations executed in the branching process unit 25 in this second embodiment will be described as follows.

When a read request of image data is issued from a certain branch destination, the branching control unit 254 acquires an index of the branching destination, and seeks the branching destination management list of the branching information management unit 252 based upon this index information in order to acquire such a branching destination information having the same index as the above index (step S21). Next, since the branching control unit 254 reads out a value of the line number counter from this acquired destination information, the branching control unit 254 acquires line information which is subsequently needed by this branching destination (step S22). For instance, in the case that the value of the line number counter is equal to zero (initial value), it can be understood that this branching destination requires a first line. Also, in the case that the value of the line number counter is equal to "10", it can be understood that this branching destination requires an eleventh line.

Next, the branching control unit 324 seeks the list of the line buffers of the buffer unit 253 to check as to whether or not the required line which is judged in the step S22 is buffered (step S23). If the requested line is buffered, then the process operation of the branching process unit 25 is advanced to a step S26, whereas if the requested line is not buffered, then the branching control unit 324 acquires the count value of the line number counter which has already been read out form the input management unit 321 (step S24).

Next, the branching control unit 254 calls the pre-staged process module via the input management unit 251 based upon this acquired counter value of the input line number counter, and provisionally reads lines until the present line reaches the required line. Alternatively, in such a case that the process module connected to the pre-staged module side owns the skip function, the branching control unit 25 skips an unnecessary line so as to read out the required line, and stores this required line into the buffer unit 253 (step S25).

It should also be noted that either a filtering process or a color converting process is connected to the post-staged process module, either a provisionally-reading process or a skipping process is no longer required, and thus, the branching control unit 254 merely reads out next lines in a sequential manner from the pre-staged process module via the input management unit 251. Also, at a first stage in the process operation of the step S25, since the line condition must be brought into (inputted lines<required lines), the reason why the resetting operation is not required is similarly given as previously explained.

At an ending time of the process operation defined in the step S25, since the required line is stored in the buffer unit 253, the branching control unit 254 copies this line data and returns it to the output buffer transferred from the called branch destination (step S26). As a result, since the read request issued from this branching destination is processed, a series of the process operations are accomplished.

Although the detail process operation is omitted in order to simplify the explanations, the process operation defined in the step S25 is given as follows: That is, when the required line is read to be stored in the buffer unit 253, if the buffer unit 253 cannot store thereinto a new line since the present capacity reaches an upper limit capacity, then a buffer deleting method thereof is realized by employing the same buffer deleting method of the first embodiment.

As previously explained, since the sufficiently large buffer capacity is owned by a certain process module which is connected to the post-stage of the branching control unit 25, the branching process operation can be carried out without resetting/skipping operation. This may be judged by the control unit 15 for connecting the process module. As a result, when the control unit 15 forms the branching module, the sort of the process module connected to the post stage thereof is analyzed, and the upper limit value of the buffer capacity of the branching process unit 25 is instructed, so that the above-described branching process operation may be realized.

In this second embodiment, such a method is described by which the same process speed as that required for buffering the entire image is obtained by using a small memory capacity. For example, similar to an on-board software system, in the case that a server restriction is made in a memory rather than a process speed, the branching process operation may be carried out without any buffer in the branching process unit 25. This example will be subsequently explained as a third embodiment.

Third Embodiment

Figure 10:
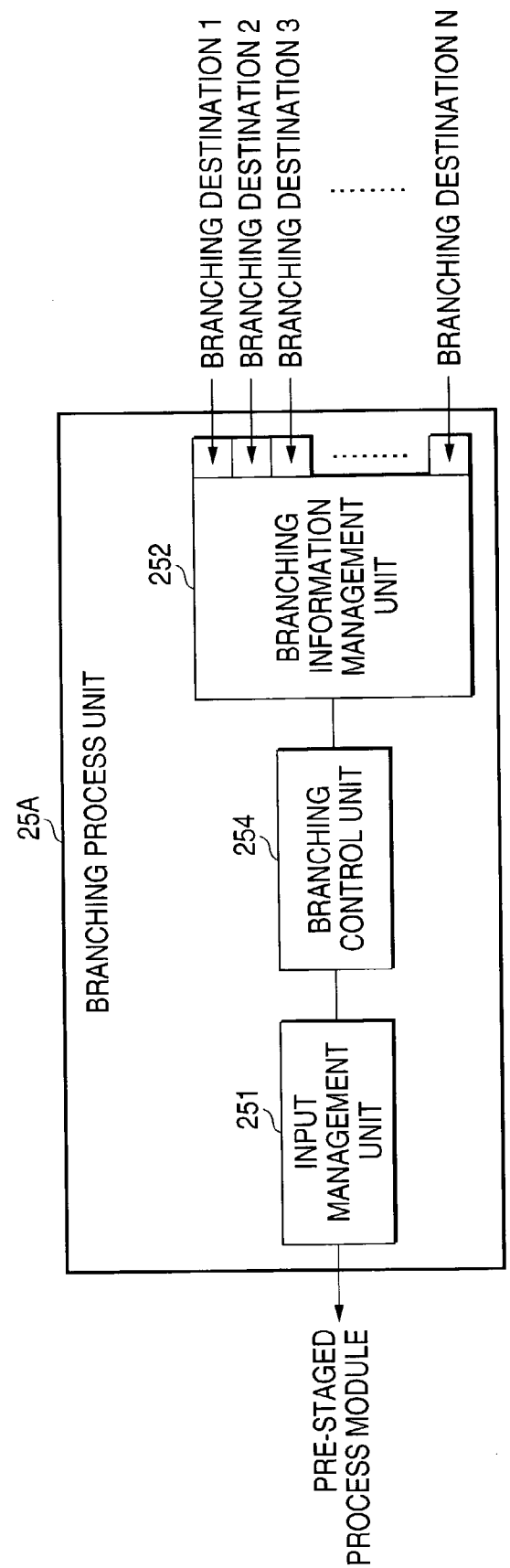
FIG. 10 is a block diagram for showing an example of an internal arrangement of a branching process unit according to a third embodiment of the present invention.

FIG. 10 is a block diagram for representing an internal arrangement of a branching process unit 25A according to a third embodiment of the present invention. It should be noted that the same reference numerals of FIG. 6 will be employed as those for indicating the same, or similar structural elements shown in FIG. 10. As apparent from FIG. 10, the branching process unit 25A according to this third embodiment is arranged by eliminating the buffer unit 253 from the above-described arrangements of the branching process units 25 according to the first and second embodiments. As a consequence, when the branching process unit 25A is formed, in FIG. 1, the control unit 15 reads the branching process device 132 from the process storage unit 13, and forms such a module of this branching process unit 25A on the memory unit 12 while only the connection information to the pre-staged module is employed as a parameter.

At this time, since the buffer unit is not provided, the upper limit value of the buffer capacity is not required as the parameter. Since operations of the respective structural units when the branching process unit 25A is formed are identical to the operations explained in the first embodiment except that since the buffer unit is not employed, such a process operation related to this buffer unit is eliminated.

Figure 11:
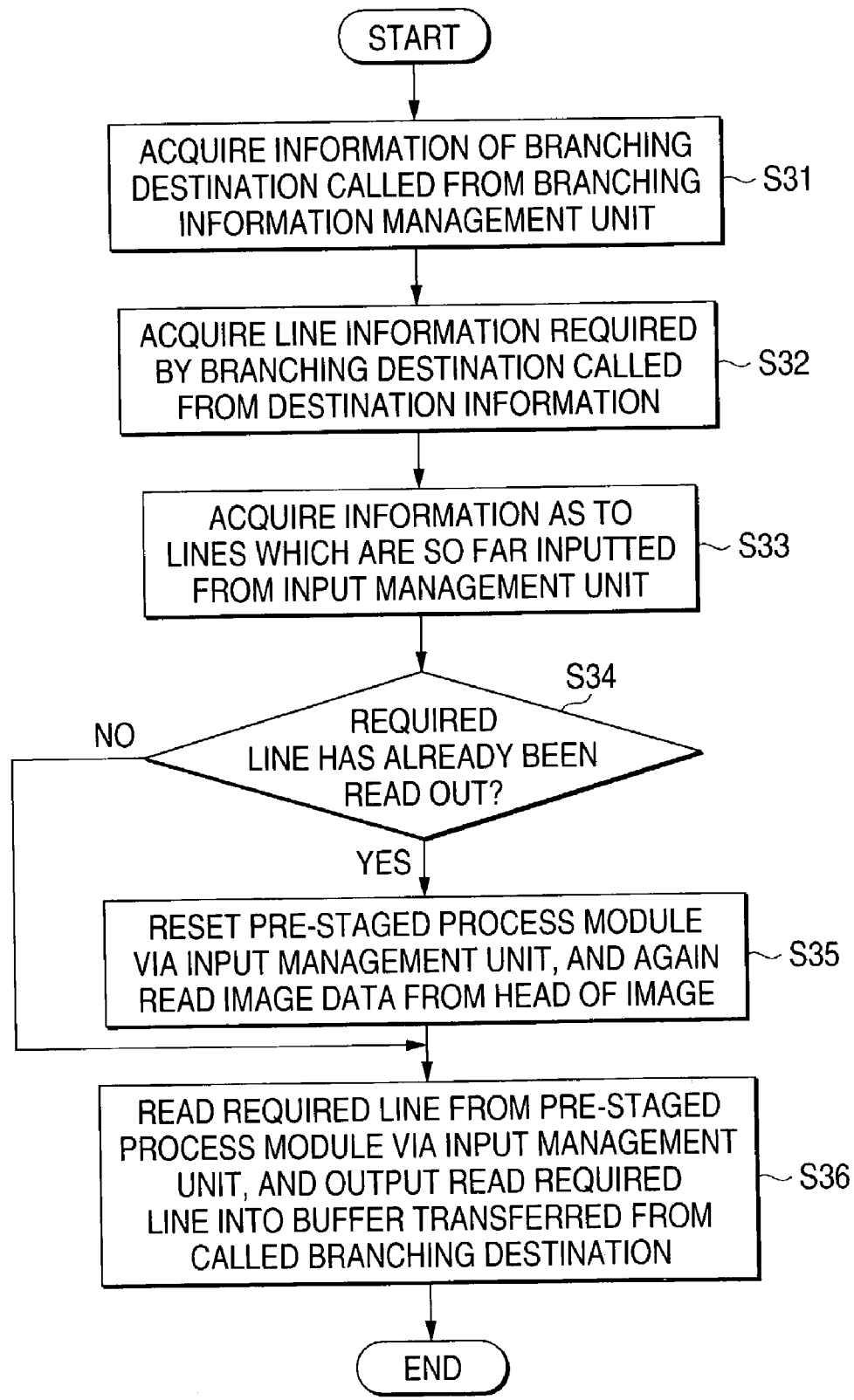
FIG. 11 is a flow chart for describing operations of the branching process unit according to the third embodiment.

In this third embodiment, it is so assumed that all of process modules containing inputs which are connected to at least the pre-stage process unit 25A own the reset functions. Subsequently, branching process operations executed in the branching process unit 25A according to this third embodiment will now be explained with reference to a flow chart shown in FIG. 11.

When a read request of image data is issued from a certain branching destination, the branching control unit 254 acquires an index of the branching destination, and seeks the branching destination management list of the branching information management unit 252 based upon this index information in order to acquire such a branching destination information having the same index as the above index (step S31). Next, since the branching control unit 254 reads out a value of the line number counter from this acquired destination information, the branching control unit 254 acquires line information which is subsequently needed by this branching destination (step S32). For instance, in the case that the value of the line number counter is equal to zero (initial value), it can be understood that this branching destination requires a first line. Also, in the case that the value of the line number counter is equal to "10", it can be understood that this branch destination requires an eleventh line.

Next, the branching control unit 254 acquires the count value of the line number counter which has already been read from the input management unit 251 (step S33). Then, the branching control unit 254 judges as to whether or not the required line is read based upon this acquired count value of the input line number counter (step s34). If the required line has not yet been read, then the process operation of this branching control unit 254 is advanced to a step S36. To the contrary, if the required line has already been read, then the branching control unit 254 resets the pre-staged module based upon the connection information to the pre-staged module held by the input management unit 251, and sets the counter value of the input line number counter to zero, so that the lines can be again read from the head line of the image (step S35).

Since such a condition of (inputted lines<required line) must be established at the time when the process operation defined at the step S35 is accomplished, the branching control unit 254 calls the pre-staged module via the input management unit 251, and provisionally reads lines until the present read line reaches the required line, or skips unnecessary lines so as to call the required line in such a case that the module connected to the pre-stage side owns the skip function. Then, this branching control unit 254 reads the called required line onto the output buffer transferred from the branch destination and returns this required line (step S36). As a result, since the read request issued from this branching destination is processed, a series of the process operations are accomplished.

In this third embodiment, although the buffers can be removed from the branching process unit 25A, when the same line is required from the branching destination, the image data of the pre-staged module are again processed by using the reset function by rewinding the lines up to the head of the image, so that process cost thereof becomes higher than that of other embodiments. As previously described also in the process operation of the step S36, if the process module provided on the pre-stage side from at least the branching process unit 25A owns the skip function, then an increase of this process cost may be suppressed to minimum allowable process cost.

As previously explained, in accordance with the present invention, as to the branching process operation of the image required in the case that while a plurality of element/functional image processing modules are prepared, various sorts of image processing functions are provided by combining these element/functional image process modules with each other, the storage capacity of the buffer can be reduced to an arbitrary storage capacity, or completely zero, although the buffer having such a storage capacity capable of storing the entire image is necessarily required in the conventional image processing system. Furthermore, the branching process operation can be carried out at the same process speed as that required for such a branching process operation for buffering the entire image, depending upon the process module connected to the post-stage thereof.

What is claimed is:

1. An image processing apparatus comprising:

image storage device for storing digital image data;

image input device having a function capable of sequentially reading required image data from at least said image storage device;

branching process device capable of outputting entered image data to a plurality of output destinations;

a process storage unit including said image input device, another image processing device, and said branching process device; and a plurality of image processing devices having a function capable of acquiring a data portion necessary for the image processing operation from at least said image input device, another image processing device, or said branching process device, and for executing a predetermined process operation as to said acquired data portion, wherein said branching process device includes:

input management device for managing input conditions from at least said image input device, or from said image processing device;

branching information management device for managing information of branching destinations;

buffer device of which upper capacity limit is capable to be designated; and branching control device for controlling an entire branching process operation.

2. The image processing apparatus as in claim 1, wherein upon receipt of an output request from a branching destination, said branching process device acquires, from said branching information management device, information as to which portion of image data said branching control device is required to output;

said branching process device acquires information as to whether or not the required portion of image data said branching control device is required to output is stored in said buffer device;

when the required portion of the image data is stored in said buffer device, said branching process device outputs the image data to the branching destination which issued the output request;

when the required portion of image data is not stored in said buffer device, said branching process device reads the required portion from said input management device and outputs the read required portion to the branching destination which issued the output request, and stores the read required portion into said buffer device.

3. The image processing apparatus as in claim 1, wherein said image input device owns a function capable of re-executing reading operations of required image data from a head of an image in addition to another function capable of sequentially reading the required image data from at least said image storage device; and said image processing device owns a function capable of acquiring the data portion required for the image processing operation from said image input device, said another image processing device, or said branching process device so as to execute a predetermined process operation for the acquired data portion in addition to a function capable of initializing a condition in such a manner that the predetermined process operation is re-executed from the head of the image.

4. The image processing apparatus as in claim 3, wherein upon receipt of an output request from a branching destination, said branching process device acquires an information that said branching control device is required to output which portion of image data form from said branching information management device;

said branching process device acquires information as to whether or not the required portion of image data said branching control device is required to output is stored in said buffer device;

when said required portion of the image data is stored in said buffer device, said branching process device outputs the image data to the branching destination which issued the output request;

when said required portion of the image data is not stored in said buffer device, said branching process device acquires information as to whether or not the required portion is inputted from said input management device;

when the required portion has not yet been inputted from the input management device, said branching process device reads the required portion from the input management device, and outputs the read required portion to the branching destination which issued the output request, and stores the read required portion into said buffer device; and when the required portion has already been inputted from the input management device, said branching process device requests the input management device to re-execute the process operation of the image from a head of the image, and again reads the required portion, and outputs the required portion to the branching destination which issued the output request and further stores the required portion into said buffer device.

5. The image processing apparatus as in claim 3, wherein when said branching process device stores data with respect to said buffer device, in such a case that the data exceeds a previously-designated capacity of said buffer device, said branching process device sequentially discards the data from said buffer device in this order of such data which are lately stored.

6. The image processing apparatus as in claim 3, wherein when said branching process device stores data with respect to said buffer device, in such a case that the data exceeds a previously-designated capacity of said buffer device, said branching process device sequentially discards the data from said buffer device in this order of such data which are located in the vicinity of the head of the image.

7. The image processing apparatus as in claim 1, wherein both said image input device and said image processing device which is one of the plurality of image processing devices own a function of skipping without performing the process operation with respect to a designated portion in response to a request; and said branching process device requests the input management device, so as to acquire a necessary data portion in such a manner that the process operation for data portions in front of the necessary data portion is skipped.

8. An image processing apparatus comprising:

image storage device for storing digital image data;

image input device having both a function capable of sequentially reading image data requested from at least said image storage device, and another function capable of re-executing the reading operation of the image data from a head of an image;

branching process device capable of outputting entered image data to a plurality of output destinations;

a process storage unit including said image input device, another image processing device, and said branching process device; and a plurality of image processing devices having both a function capable of acquiring a data portion necessary for the image processing operation from at least said image input device, another image processing device, or said branching process device, and for executing a predetermined process operation as to said acquired data portion, and another function capable of initializing a condition in such a manner that said predetermined process operation is re-executed from the head of the image, wherein said branching process device includes:

input management device for managing input conditions from at least said image input device, or from said image processing device; and branching information management device for managing information of branch destinations.

9. The image processing apparatus as in claim 8, wherein upon receipt of an output request from a branching destination, said branching process device acquires, from said branching information management device, information as to which portion of image data said branching control device is required to output;

said branching process device acquires information as to whether or not the required portion of image data said branching control device is required to output is stored in said buffer device;

when said required image data portion has not yet been inputted, said branching process device reads the required data portion from the input management device, and outputs the read required data portion to the branching destination which issued the output request; and when said required image data portion has already been inputted from the input management device said branching process device requests the input management device, to re-execute the process operation from the head of the image, and again reads the required data portion to output the read required data portion to the branching destination which issued the output request.

10. The image processing apparatus as in claim 8, wherein both said image input device and said image processing device which is one of the plurality of image processing devices own a function of skipping without performing the process operation with respect to a designated portion in response to a request; and said branching process device requests the input management device so as to acquire a necessary data portion in such a manner that the process operation for data portions in front of the necessary data portion is skipped.

11. A pipeline process for an image processing, which is performed by plurality of process modules including an image inputting process module for inputting process-purposed image data, and a branching process module capable of outputting the inputted image data to a plurality of output destinations, said plurality of process modules and said branching process module being connected to each other in a pipeline mode, said pipeline process comprising the steps of:

re-executing a process operation from a head of the process-purposed image data by each of said plural process modules, and managing at least an arbitrary number of branching destinations by said branching process module.

\* \* \* \* \*